E. G. STAUDE.
VARIABLE SPEED TRANSMISSION.
APPLICATION FILED JAN. 26, 1911.

1,192,580.

Patented July 25, 1916.
3 SHEETS—SHEET 1.

WITNESSES

INVENTOR
EDWIN G. STAUDE
BY Paul & Paul
ATTORNEYS

E. G. STAUDE.
VARIABLE SPEED TRANSMISSION.
APPLICATION FILED JAN. 26, 1911.

1,192,580.

Patented July 25, 1916.
3 SHEETS—SHEET 2.

WITNESSES

INVENTOR
EDWIN G. STAUDE

BY Paul & Paul
ATTORNEYS

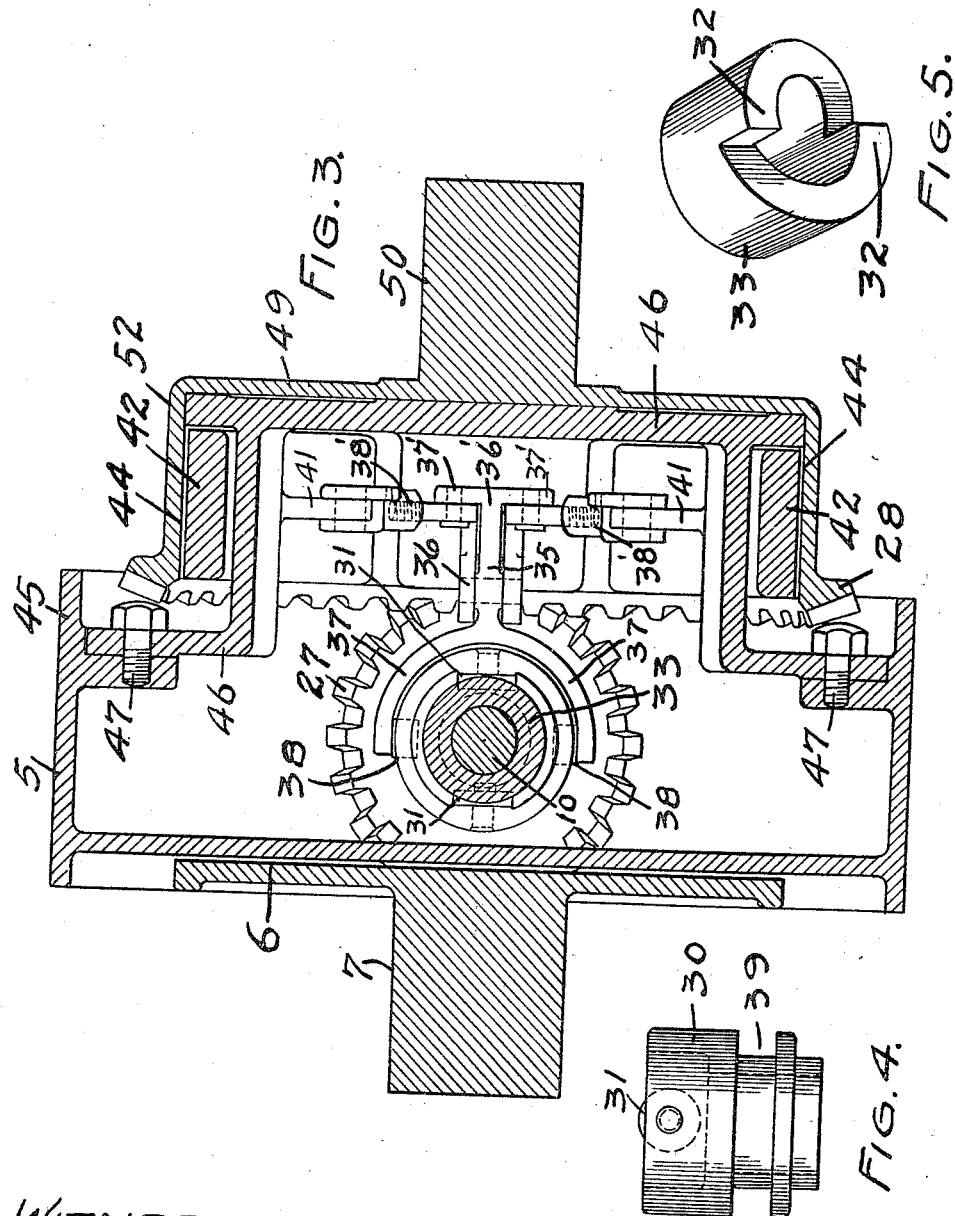

UNITED STATES PATENT OFFICE.

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

VARIABLE-SPEED TRANSMISSION.

1,192,580.   Specification of Letters Patent.   Patented July 25, 1916.

Application filed January 26, 1911. Serial No. 604,820.

*To all whom it may concern:*

Be it known that I, EDWIN G. STAUDE, of Minneapolis, Hennepin county, Minnesota, have invented certain new and useful Improvements in Variable-Speed Transmission, of which the following is a specification.

The primary object of my invention is to provide a positive variable speed friction clutch transmission which shall be a direct drive on high speed.

A further object is to provide a speed controlling mechanism, which shall not act as a power transmitter, but, positively govern the speed of the driven member.

A further object is to provide a construction which shall be simple and compact as well as highly efficient in the economical transmission of power.

The invention consists generally in various constructions and combinations, all as hereinafter described and particularly pointed out in the claims.

Figure 1:
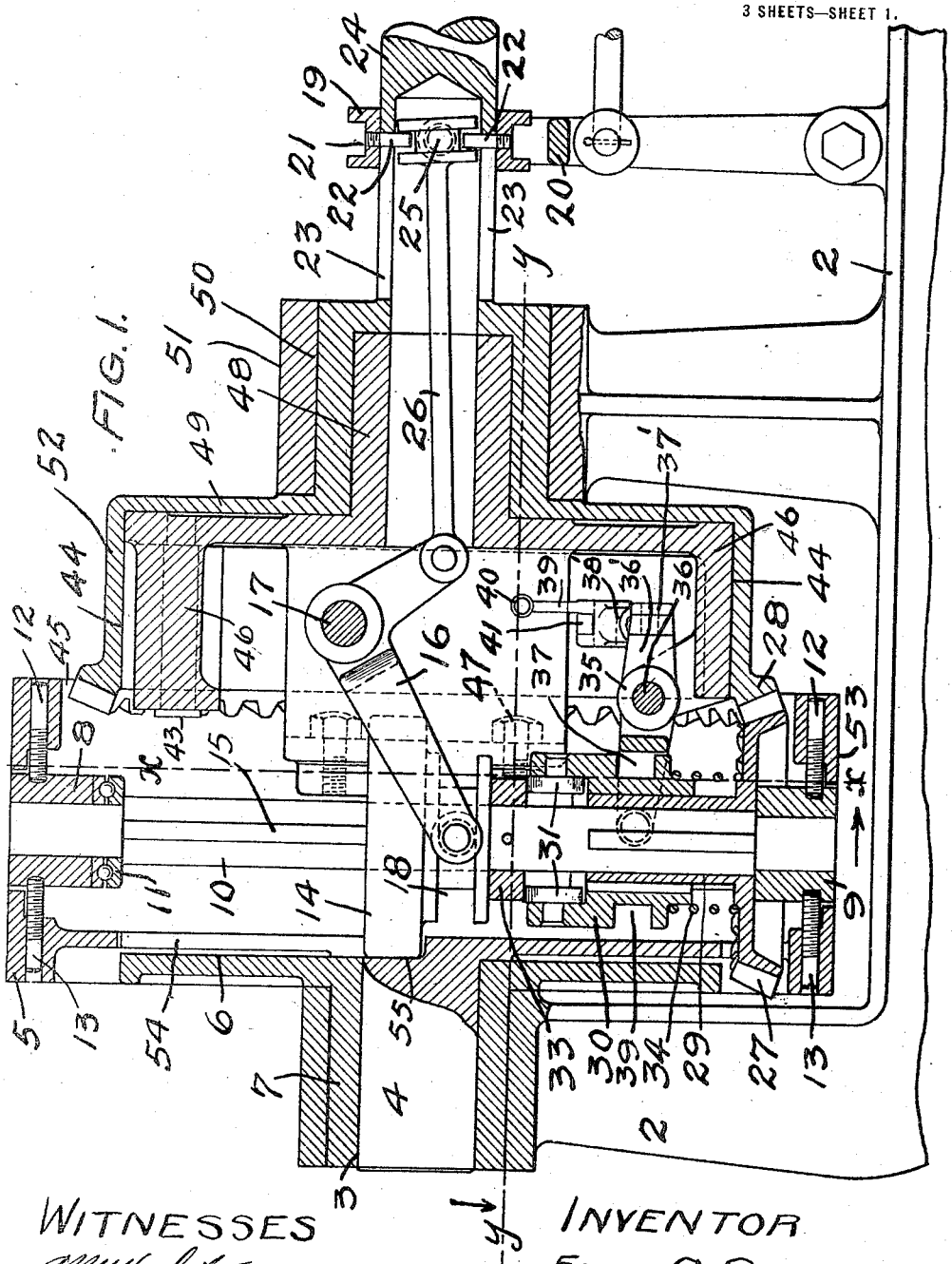
Figure 2:
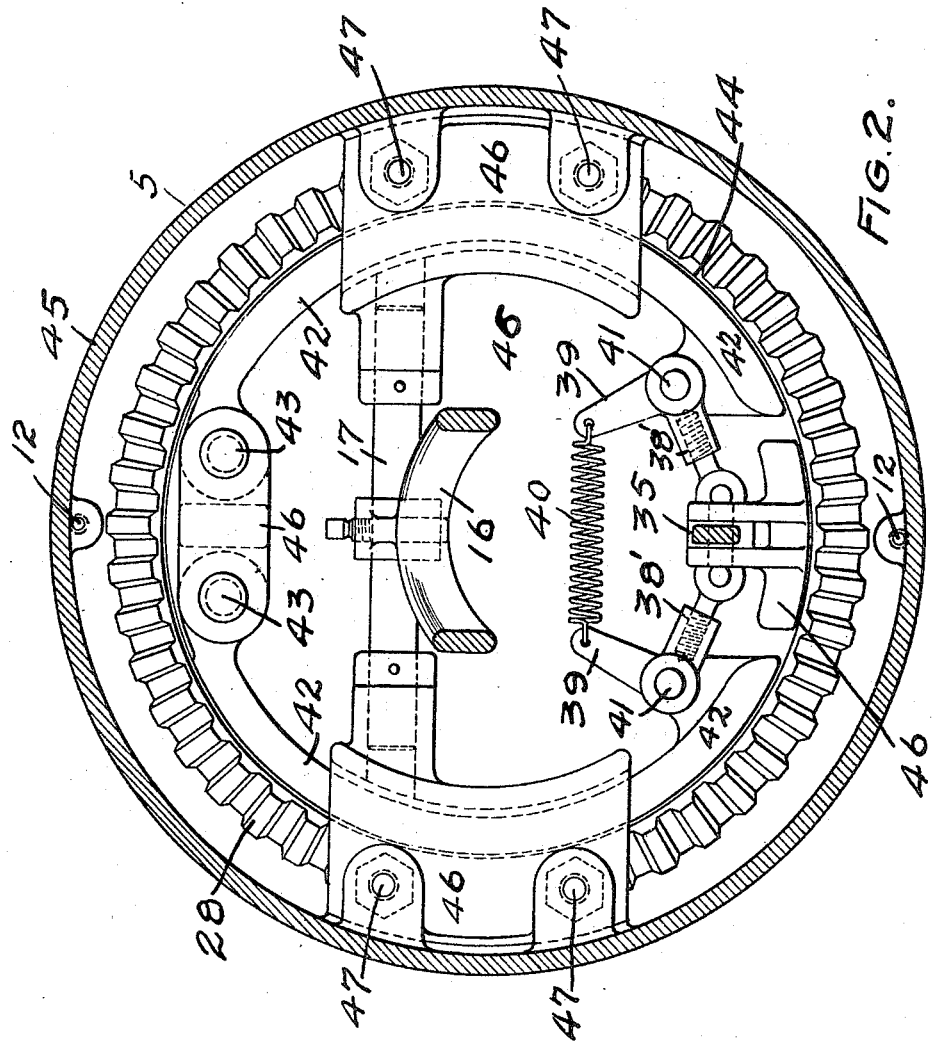

In the accompanying drawings forming part of this specification, Figure 1 is a vertical section of the variable speed transmission embodying my invention, Fig. 2 is a vertical section on the line *x—x* of Fig. 1, looking in the direction of the arrow, Fig. 3 is a horizontal section on the line *y—y* of Fig. 1 looking in the direction of the arrow, Figs. 4 and 5 are details of the speed controlling mechanism.

As shown in the drawing, 2 represents a bracket or base for supporting the speed controlling mechanism having a bearing at 3 for supporting the shaft 4 of the driving member 5. The disk 6 is arranged concentric to the bearing 3 and for convenience in manufacture, I have shown this disk provided with a hub 7, which is pressed into place and rigidly secured to the frame 2 and forms the bearing 3. Mounted on the bearings 8 and 9 is a shaft 10 having a ball bearing collar 11. The bearings 8 and 9 are adjusted by suitable blind set screws 12 and 13. Mounted on the shaft 10 is a wheel 14 and 13. Mounted on the shaft 10 is a wheel 14, which operates on the surface of the disk 6 and is arranged by a suitable spline to slide in the key-way 15 on the shaft 10. A bell crank 16 is pivoted at 17 and has an operative connection with the groove 18 on the wheel 14 and is adjusted to the required position by means of a collar 19 having the usual controlling lever consisting of a fork 20 adapted to operate in the groove 21 in the usual manner. Pins 22 project through a slot 23 of the driven member 24 and operate in a groove 25 on the rod 26, which is fastened to the short arm of the bell crank 16.

From the construction just described, the movement of the collar toward and from the transmission will operate the controlling wheel 14 toward and away from the center of the transmission.

Mounted on one end of the shaft 10 is a bevel gear 27 meshing into another bevel gear 28, which is formed integral with the driven member 24. The bevel gear 27 has a sleeve 29 to give sufficient bearing surface for the gear, and mounted over the sleeve is a sliding member 30 having rollers 31 adapted to operate against the inclined surfaces 32 of the collar 33, secured to the shaft 10 in any desirable manner. A spring 34 holds the member 30 containing the rollers 31 firmly against the collar 33. A lever 35 is pivoted at 36 on the driving member and has a fork 37 and rollers 38 adapted to operate in an annular groove 39 on the member 30. The opposite end of the lever 35 has a projection 36' and lugs 37' to which are pivoted adjustable connecting rods 38'. The connecting rods 38' have arms 39 and are connected by a spring 40. The opposite ends of the connecting rods 38' are pivoted at a point 41 to the friction clutch shoes 42. These shoes are pivoted at a point 43 on the driving member 5 and operate against surfaces 44 on the driven member 24.

For convenience in assembling, the driving member 5 is composed of parts 45 and 46, shown in Fig. 3, and these parts are secured to each other by cap screws 47. The various pivots and projections, such as the pivots 43 for the shoes and the pivot 36 for the lever 35 and the bearings for the pivot 17 are cast integral with the member 46. An annular projection 48, which centers as well as acts as a bearing for the member 49, is formed on the part 46. This member 49 has a concentric surface 50, which operates in a bearing 51 supported from the bracket 2.

Power may be transmitted from the driven member through the shaft 24, or, I may apply a belt on the surface 52 of the member 49. I have shown a construction wherein the driving member is driven by a belt operating on the surface 53 of the driving member 5. I do not, however, confine myself to this method of driving as I may extend the shaft 4 and use that as a means for driving the driving member.

I have shown a slot 54 through which the controlling wheel 14 operates on the surface 6 of the disk; but it is evident that I may modify this construction in various ways.

The operation of the mechanism is as follows: The belt is applied to the surface 53 on the driving member which revolves in the bearings 3 and 48. The driven member being stationary, it follows that the bevel gear 27 must revolve about its axis, being driven by the gear 28. The member 30 is splined on the sleeve 29 of the gear 27 and permitted to slide thereon but will revolve with the gear 27 and if the controlling wheel 14 is moved out to the edge of the disk 6, it will revolve at the same speed that the gear 27 revolves and allow the clutch mechanism, consisting of the shoes 42 and the surfaces 44, to remain inoperative and therefore will not revolve the driven member. As soon as the controlling wheel 14 is moved toward the center of the disk 6, it will not revolve as fast as the gear 27 must revolve in order to allow the driven member to remain stationary. This will cause the rollers 31 to run up the incline 32 on the collar 33 and force the member 30 toward the gear 27 against the tension of the spring 34, which will move the lever 35 in a direction that will cause the projection with the lugs 37' to force the pivots 41 apart by means of the connecting rods 38', acting as a toggle lever. The shoes 42 being expanded will cause a friction against the surfaces 44 of the member 49. This friction will increase as the rollers 31 continue to advance up on the inclines 32 to a point where the clutch must evidently pick up and revolve the driven member. When the driven member revolves it follows that the gear 27 must either stop or at least reduce its speed. The controlling wheel 14 operating at a given speed, which is slower than the initial speed of the gear 27, will drive the collar 33 and cause the rollers 31 to come down the incline of the surface 32 on the collar 33. This action would tend to release the clutch members again and allow the member 49 to remain stationary. The rollers 31 will adjust themselves at a certain position on the inclined surface 32 where they will carry the load at a continuous speed, regulated by the position of the controlling wheel 14. When the controlling wheel is moved into the position shown in Fig. 1, it is moved off from the surface 6 on the moving surface 55, which is part of the driving member 5, and in this position there is no movement of the controlling wheel 14, and the result is that the rollers 31 will run up the incline 32 on the collar 33 until the shoes 42 are securely set on the surfaces 44 of the driven member 49. The more load applied to the driven member 24 the more power will be applied to the bevel gear 27 through the action of the wheels 31 operating on the inclined surfaces 32 the more securely will the shoes 42 be set to operate the driven member.

I claim as my invention:—

1. The combination, with a driving member, of a normally stationary driven member, a shaft mounted to revolve transversely of said driven member, a friction wheel splined on said shaft and movable radially with respect to said driving member, means for radially moving said friction wheel and means having a friction surface for said wheel, gears interposed between said shaft and said driven member, said shaft gear revolving loosely on said shaft, and mechanism actuated by the relative rotation of said shaft and gear for connecting said driving and driven members.

2. The combination, with a driving member and a friction disk, of a normally stationary driven member having a gear, a shaft mounted transversely of said driving member, a friction wheel splined on said shaft and arranged to contact with said disk, a gear loosely mounted on said shaft and meshing with said driven member gear, and mechanism actuated by the relative rotation of said shaft and gear for connecting said driving and driven members.

3. The combination, with a driving member, of a normally stationary driven member, a shaft mounted to revolve with said driving member, a disk having a friction surface, a friction wheel splined on said shaft and arranged to contact with said driving member, and with said disk, a collar having an inclined surface mounted on said shaft, a sleeve slidable on said shaft and having anti-friction wheels to engage said surface, said sleeve being actuated by the relative rotation of said shaft and sleeve, and mechanism actuated by the movement of said sleeve for connecting said driving and driven members.

4. The combination, with a driving member, of a normally stationary driven member having a gear mounted thereon, a speed controlling mechanism, including a shaft having a loosely mounted gear meshing with the gear of said driven member, means actuated by said driving member for revolving said shaft at a variable speed, said actuating means being adjustable radially with respect to said driving member, and mechanism, including a clutch member, actuated by the relative rotation of said shaft and its gear for operatively connecting said driving and said driven members.

In witness whereof, I have hereunto set my hand this 17" day of January 1911.

EDWIN GUSTAVE STAUDE.

Witnesses:
GENEVIEVE E. SORENSEN,
EDWARD A. PAUL.

Copies of this patent may be obtained for five cents each, by addressing the "Commissioner of Patents, Washington, D. C."